United States Patent [19]

Yoshihara et al.

[11] 3,968,306

[45] July 6, 1976

[54] PLASTIC ARTICLES HAVING IMPROVED SURFACE CHARACTERISTICS

[75] Inventors: Toshio Yoshihara; Keisuke Yoshihara; Tuneo Ikeda; Yasuyuki Yamasaki; Akira Oshima, all of Ohtake; Naoyuki Fukabori, Kanagawa, all of Japan

[73] Assignee: Mitsubishi Rayon Co., Ltd., Tokyo, Japan

[22] Filed: July 19, 1973

[21] Appl. No.: 380,560

[30] Foreign Application Priority Data

July 21, 1972 Japan.............................. 47-72577

[52] U.S. Cl. ............................. 428/336; 264/219; 427/385; 427/386; 428/413; 428/482; 428/483; 428/500; 428/515; 428/518; 428/520; 428/522; 428/523; 526/328; 526/321

[51] Int. Cl.² .................... B32B 27/06; B32B 27/36

[58] Field of Search ... 117/138.8 UA, 622, 161 UC, 117/139.5 CQ; 260/86.1 R, 86.1 E, 79.3 M, 78.5 T; 427/341, 385, 430, 44; 428/336, 413, 483, 482, 515, 500, 518, 520, 522, 523

[56] References Cited

UNITED STATES PATENTS

| | | | |
|---|---|---|---|
| 2,849,426 | 8/1958 | Miller | 260/78.5 T |
| 3,062,674 | 11/1962 | Houck et al. | 117/161 UC |
| 3,264,372 | 8/1966 | Deichert et al. | 117/138.8 UA |
| 3,265,764 | 8/1966 | Deichert et al. | 117/138.8 UA |
| 3,366,507 | 1/1968 | Wilkinson | 117/161 UC |
| 3,400,103 | 9/1968 | Samour et al. | 260/86.1 E |
| 3,767,600 | 10/1973 | Albright | 260/86.1 E |
| 3,778,294 | 12/1973 | Krauch et al. | 117/161 UC |

*Primary Examiner*—Harry J. Gwinnell
*Assistant Examiner*—Sadie L. Childs
*Attorney, Agent, or Firm*—Armstrong, Nikaido & Wegner

[57] ABSTRACT

A plastic article having improved surface characteristics comprises a plastic body having adhered thereon a cross-linked film of a composition comprising (A) 10 to 90 parts by weight of a cross-linking unsaturated compound having a molecular weight of M and containing in the molecule N polymerizable ethylenically unsaturated radicals (N being an integer of 2 or more), the ratio of said molecular weight, M, to said number, N, of ethylenically unsaturated radicals (M/N) being about 49 to about 600, (B) 90 to 10 parts by weight of an unsaturated monomer containing in the molecule at least one radical copolymerizable with said component (A) and at least one acid radical, and (C) up to 20 parts by weight of other copolymerizable unsaturated compounds, the total of (A), (B) and (C) being 100 parts by weight, at least a part of the acid radicals contained in the film having been converted into alkali salts thereof, said cross-linked film having a thickness of 5 to 500 μ. The above plastic article is produced by forming on the surface of a plastic body a cross-linked film of the composition comprising the components (A), (B) and (C) and then treating the cross-linked film with a base to convert the acid radical into its alkali salt.

7 Claims, No Drawings

PLASTIC ARTICLES HAVING IMPROVED SURFACE CHARACTERISTICS

This invention relates to a method for manufacturing plastic articles having improved surface characteristics and a method for manufacturing thereof, and particularly to a method for manufacturing plastic articles having desirable characeristics, such as antistatic capability, anti-clouding performance, and surface hardness, all together.

It has been pointed out that the following surface properties are generally counted as serious disadvantages of plastic articles, and improvement in these properties has been hoped for:
1. Susceptibility to accumulation of static electricity because of electric insulating property;
2. tendency to become cloudy when left under an atmosphere of higher relative humidity because of poor wettability due to hydrophobic nature; and
3. low scratch resistance due to insufficient surface hardness.

Various improved methods have heretofore been proposed to impart antistatic capability, anti-clouding performance, or improved hardness to plastic articles. However, since the above-noted characteristics, (1) to (3), are of the different nature from each other, and particularly, the antistatic capability and the anti-clouding performance are essentially inconsistent to surface hardness, there has hitherto been found no method for manufacturing plastic articles satisfactory in all of the three characteristics.

As a result of investigations on the manufacturing method for the plastic articles which are satisfactory in all of the above-mentioned three characteristics, the present inventors have now found that the object may be achieved by forming on the plastic article a film of a network structure containing a certain amount of acid group and then treating the film with a basic substance to convert at least a part of the acid group contained in the film of a network structure into an alkali salt thereof.

According to this invention, there is provide a plastic article having improved surface characteristics, which comprises a plastic body having adhered thereon a cross-linked film of a composition comprising (A) 10 to 90 parts by weight of a cross-linking unsaturated compound having a molecular weight of M and containing in the molecule N polymerizable ethylenically unsaturated radicals (N is an integer of 2 or more), the ratio of said molecular weight, M, to said number, N, of ethylenically unsaturated radicals (M/N) being about 49 to about 600, (B) 90 to 10 parts by weight of an unsaturated monomer containing in the molecule at least one radical copolymerizable with said component (A) and at least one acid radical, and, if necessary, up to 20 parts by weight of other copolymerizable unsaturated compounds, the total of (A), (B) and (C) having 100 parts by weight, at least a part, preferably more than 50 mole percent, of the acid radical contained in the film having been converted into its alkali salt, said cross-linked film having a thickness of 5 to 500 $\mu$.

According to this invention, the above plastic article is produced by forming on the surface of a plastic body a cross-linked film of the above composition of the components (A), (B) and (C), said film having a thickness of 5 to 500 $\mu$, and then treating the said film with a base to convert at least a part, preferably more than 50 mole percent, of the acid radical contained in the film into its alkali salt.

One of the embodiments of this invention is a method to obtain a plastic article having on its surface the cross-linked film of the composition comprising the components (A), (B) and (C), which is prepared by coating a sheet or plate with a composition comprising the components (A), (B) and (C), subjecting the coated sheet or plate to heat-treatment and/or exposure to an activated energy radiation to obtain a sheet or plate having on its surface a cross-linked film of the composition comprising the components (A), (B) and (C); assembling a cell so that at least one of the inner surfaces of the cell is the surface of said coated sheet or plate; pouring a vinyl monomer for forming a plastic body into the cell; allowing the monomer to polymerize and cure; removing the cell to obtain a plastic article having a cross-linked film containing acid groups on the surface of the article; and then treating the film with a basic compound. Another embodiment is a method comprising coating a composition comprising the aforesaid components (A), (B) and (C) on a plastic article and then cross-linking the resulting coating to obtain the plastic article having the above-mentioned coating; and the surface thereof is treated with a basic compound.

The composition comprising the components (A), (B) and (C) for use in practising this invention includes as embodiments a composition containing as the component (B) an unsaturated compound having in its molecule at least one copolymerizable unsaturated radical and an acid group and an alkali salt of said unsaturated compound in a mole ratio of the salt to the acid of at least 50/50, and also a composition containing 0.1 to 20 parts by weight of water per 100 parts by weight of the composition comprising the aforesaid components (A), (B) and (C). When the alkali salt is used, the subsequent treatment with the basic compound may be omitted.

The plastic articles for use in practising this invention include those composed of homopolymers or copolymers of monovinyl monomers such as methyl methacrylate, ethyl methacrylate, butyl methacrylate, cyclohexyl methacrylate, lauryl methacrylate, methyl acrylate, ethyl acrylate, butyl acrylate, 2-ethylhexyl acrylate, styrene, acrylonitrile, methacrylonitrile, vinyl chloride, and vinylidene chloride; those composed of copolymers of said monovinyl monomers with small amounts of crosslinking agents such as ethylene glycol dimethacrylate, diethylene glycol dimethacrylate, trimethylol propane triacrylate, and glycerine triacrylate; and those composed of unsaturated polyesters cured by cross-linking.

The component (A) for use in forming a cross-linked film having an acid group on the surface of plastic articles in practising this invention is a cross-linking unsaturated compound having a molecular weight of M and containing in the molecule N polymerizable ethylenically unsaturated radicals (N is an integer of 2 or more), the ratio M/N being in the range of about 49 to about 600. Examples of the compounds are allyl acrylate, allyl methacrylate, methallyl acrylate; di-, tri-, or tetraesters of $\alpha,\beta$-unsaturated carboxylic acids with polyhydric alcohols; examples of these $\alpha,\beta$-unsaturated carboxylic acids are acrylic acid, methacrylic acid, and crotonic acid, and examples of the polyhydric alcohols are ethylene glycol, propylene glycol, butanediol, propanediol, hexylene glycol, neopentyl glycol, trimethylolpropane, glycerine, trimethylolethane, and pentacrythritol. Other examples of the cross-linking unsaturated compounds include addition products of glycidyl acrylate or glycidyl methacrylate with polybasic carboxylic acids such as, for example, maleic acid, fumaric acid, succinic acid, sebacic acid, and adipic acid, or with monocarboxylic acids, such as acrylic acid, methacrylic acid, crotonic acid and itaconic acid; addition products of an epoxy resin, obtained by reaction of bisphenol-A and epichlorohydrin, with acrylic acid, methacrylic acid, and crotonic acid; polyethylene glycol dimethacrylate, and polypropylene glycol dimethacrylate.

The unsaturated compound for use as the component (A) becomes undesirable when the ratio of the molecular weight, M, to the number of ethylenically unsaturated radicals in one molecule, N, is smaller than about 49, because if a composition containing such a component (A) is cross-linked to form a cross-linked film there appears a phenomenon of rapid shrinkage of the film which tends to cause warping and other strains in the plastic article, and, moreover, there occurs a marked increase in the cross-linking density of the film formed on the plastic article, inducing a tendency to decrease in impact resistance and scratch resistance, and in the efficiency of treating the plastic article with a basic compound. On the other hand, a composition containing a component (A) having a ratio M/N larger than about 600 is undesirable because if such a composition is used the film formed on a plastic article gives a soft surface which in turn gives insufficient resistance to abrasion and solvent, and if such a plastic article is treated with a basic compound such disadvantages result that the plastic article is opacified or causes crazing.

The components (B) to be used in practising this invention include acrylic acid; methacrylic acid; itaconic acid; crotonic acid; unsaturated carboxylic acids represented by the formula,

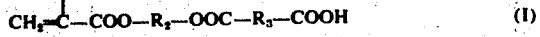

wherein $R_1$ is hydrogen or methyl group, $R_2$ is an alkylene group having 1 to 8 carbon atoms, and $R_3$ is an alkylene group having 1 to 8 carbon atoms, —CH = CH—, or

unsaturated carboxylic acids represented by the formula,

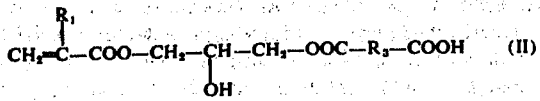

wherein $R_1$ and $R_3$ are the same as defined above; styrenesulfonic acid; and monoallyl esters or monomethallyl esters of dibasic acids such as, for example, succinic acid, maleic acid, fumaric acid, sebacic acid, and adipic acid. The compound represented by the formula (I) may be prepared by reacting a hydroxyalkyl acrylate or methacrylate represented by the formula (III),

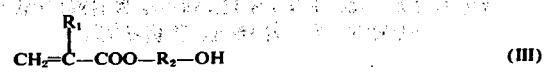

(where $R_1$ and $R_2$ are the same as defined above) with a dicarboxylic acid or an anhydride thereof represented by the formula (IV) or (IV'):

(where $R_3$ is the same as defined above). Examples of the compounds represented by the formula (III) include acrylates or methacrylates having a hydroxyalkyl group such as 2-hydroxyethyl, 3-hydroxypropyl, 2-hydroxypropyl, 4-hydroxybutyl, 6-hydroxyhexyl, or 8-hydroxyoctyl. The carboxylic acids or carboxylic anhydrides represented by the formula (IV) or (IV') are, for example, succinic acid, maleic acid, fumaric acid, adipic acid, sebacic acid, phthalic acid, succinic anhydride, maleic anhydride, phthalic anhydride, etc.

The compound represent by the formula (II) may be prepared by addition reaction of glycidyl acrylate or glycidyl methacrylate with a carboxylic acid represented by the formula (IV').

The amount of the component (B), or the acid component, contained in the film-forming composition should be within the range of 10 to 90 parts by weight. The surface of a plastic article having a cross-linked film formed from a composition containing less than 10 parts by weight of the component (B) cannot be made sufficiently hydrophilic to achieve the object of this invention even when treated with a basic compound. On the other hand, a composition containing more than 90 parts by weight of the component (B) is not desirable because the cross-linked film formed from such a composition cannot be cross-linked to a sufficiently high degree to improve impact resistance and scratch resistance of a plastic article; and, moreover, the plastic article treated with a basic compound is deteriorated in the characteristic properties such as chemical resistance, water resistance, and moisture resistance. Therefore, the amount of the component (B) contained in the film-forming composition should be within the range of 10 to 90 parts by weight, preferably 30 to 70 parts by weight.

It is not necessary to use the whole of the acid component (B) in the state of free acid, and a part thereof may be used in the form of an alkali salt. The alkali salt may be a salt of the above-mentioned acid with ammonium, sodium, potassium, magnesium, calcium, or an amine, though the ammonium salt is preferred in view of its solubility in the component (A). The mixing mole ratio of the alkali salt to the free acid should be at least 50/50. If the ratio is less than 50/50, the merit of the joint use of the free acid and the alkali salt is hardly recognizable. The acid component (B) partly mixed with its alkali salt is preferably used particularly when there is used in fabricating a plastic article a mold made of glass or a metal whose surface is of hydrophilic nature, because in this case it is possible to impart to the plastic article an antistatic capability and an anti-clouding performance in accordance with the object of this invention. Such a method for fabricating a plastic article can enhance the merit of this invention because it is possible to form a film richer in acid radical on the surface layer of the finished plastic article.

The component (C) for use in practising this invention may be a monoester compound of acrylic acid, methacrylic acid or crotonic acid with a polyhydric alcohol, such as, for example, ethylene glycol, propylene glycol, 1,3-butylene glycol, 1,4-butylene glycol, or 1,6-hexylene glycol. Examples of the compounds are 2-hydroxyethyl (meth)acrylate, 2-hydroxypropyl (meth)acrylate, 3-hydroxypropyl (meth)acrylate, and the like. Diacetone (meth)acrylamide and N-methylol (meth)acrylamide may also be used among others. These compounds act as a component to further improve the antistatic capability and anti-clouding performance of the plastic article obtained by the method of this invention. The amount to be used in the film-forming composition is up to 20 parts by weight preferably within the range of about 5 to about 15 parts by weight. A composition containing more than 20 parts by weight of the component (C) is undesirable because the film formed from such a composition will show a tendency toward decreased abrasion resistance and solvent resistance.

The effectiveness of this invention is further enhanced by addition of water in a proportion of 0.5 to 20 parts by weight per 100 parts by weight of the compound comprising the components (A), (B) and (C), in forming a cross-linked film on the surface of a plastic article. The acid radical contained in the said composition sufficiently dissociates by the action of the existing water, and at the same time the copolymerizability of the unsaturated compound containing acid radicals, i.e. the component (B), is improved. The film formed from such a composition is more improved in transparency as well as in chemical resistance and other characteristics, and, moreover, in durability of the antistatic capability.

Treatment with a basic compound of the plastic article bearing the adhered film having the above-said characteristics is conducted in the following way: Prior to the treatment, a basic solution of a concentration of 0.05 to 5 % by weight is maintained at a temperature from room temperature to 80°C., and then the above-said plastic article is treated with this basic solution under the conditions that the contact time may become about 1 to 60 minutes. The basic compounds to be used are sodium hydroxide, potassium hydroxide, lithium hydroxide, ammonia, ammonium hydroxide, and diethanolamine. The solvents for use in dissolving the basic compound are preferably those which do not substantially dissolve nor swell the above-said plastic article; suitable solvents are water, methanol, and ethanol. Gaseous ammonia may be used as the basic compound.

In practising this invention, in order to form cross-linked and cured film adhereing firmly to the surface of a plastic article, there is available a method in which a composition consisting essentially of the components (A), (B) and (C) is admixed with a radical polymerization initiator such as, for example, benzoyl peroxide, cumene hydroperoxide, lauroyl peroxide, or di-tert-butyl peroxide and then heat-treated; or a method in which said composition is admixed with a photopolymerization catalyst such as, for example, azobisisobutyronitrile, benzoin, benzoin ethyl ether, benzoin isopropyl ether, benzil, benzophenone, anthraquinone, or benzoquinone, and then exposed to a light having a wave length in the range of 2,000 to 8,000 A, preferably 3,000 to 4,000 A; or a method in which said composition is exposed to an ionizing radiation such as electron beam, α-ray, or γ-ray. When an electron beam is utilized as the radiation, the film is exposed to the electron beam so that the absorption dose may be 0.1 to 100 Mrad, preferably 1 to 50 Mrad.

A procedure for manufacturing the plastic article according to this invention is explained below as one embodiment of this invention.

A composition consisting essentially of the components (A), (B), and (C) is coated on the inner walls of a mold fabricated from glass or metal plates and converted into cross-linked film by heat-treatment or by exposure to a light or a radiation. Then, a material for producing a plastic body is introduced into the mold and polymerized. The polymerized plastic article is discharged from the mold, immersed in a 2 %-aqueous sodium hydroxide solution for about 10 minutes, washed with water, and then dried.

Another procedure comprises coating a plastic article with a composition consisting essentially of (A), (B), and (C), heat-treating the coated article or exposing the coated article to light or a radiation to obtain the plastic article covered with a cross-linked film, and thereafter subjecting the thus-obtained plastic article to a treatment with a basic compound, washing with water, and drying in the same manner as in the afore-said procedure.

The thickness of the cross-linked film to be formed on a plastic article is ordinarily 5 to 500 $\mu$, preferably 10 to 100 $\mu$. If the film thickness is below 5 $\mu$, the full effect aimed at by this invention can hardly be obtained, whilst if the film thickness exceeds 500 $\mu$, adhesion of the film to the plastic substrate may sometimes be undesirably decreased.

The plastic article manufactured by the method of this invention has a surface layer which is extremely solid yet sufficiently flexible and contains highly hydrophilic radicals distributed densely and uniformly. On account of such a surface layer, the plastic article of this invention is rich in abrasion resistance, impact resistance, soil resistance, antistatic capability, and anti-clouding performance. As compared with the conventional method for manufacturing a plastic article by shaping a plastic material admixed with a compound capable of imparting a hydrophilic property, the present invention achieves far superior results without impairing the inherent characteristic properties of a plastic article.

The invention is illustrated below in further detail with reference to Examples. In Examples all parts and percentages are by weight, unless otherwise specified.

Evaluation of the surface hardness, adhesion between the plastic substrate and the coating, antistatic capability, and anti-clouding performance was carried out in the following manner.

Surface hardness: Surface hardness was expressed in terms of abrasion caused by a falling sand. From a height of 70 cm above the test specimen, 200 g of 60-mesh carborundum granules were allowed to fall on the test specimen at a rate of 150 g/min. While rotating the test specimen, which was fixed in a position inclined at 45° to the horizontal plane, about a vertical axis at 11 rpm. The surface reflectance of the test specimen was measured before and after the test. The percentage retention in reflectance was taken as the measure of abrasion.

Percentage retention in reflectance $$= 1 - \left\{ \frac{\text{(Reflectance before test)} - \text{(Reflectance after test)}}{\text{(Reflectance before test)}} \right\} \times 100$$

An ordinary thermoplastic resin shows a percentage retention in reflectance of 10 to 40 %, while in the case of this invention a percentage retention in reflectance was found to be 40 to 99%.

Adhesion of film to substrate: Adhesion of film to the substrate was evaluated by a cross-cut test. Straight streaks at 1 mm intervals were cut crosswise by means of a stencile pen to the depth reaching the substrate, thereby forming 100 squares. A cellophane tape adhered to the surface was abruptly peeled away and the surface appearance was inspected to evaluate the adhesion.

Antistatic capability: In order to evaluate the antistatic capability, a test specimen was measured for surface resistance by means of an insulating-resistance tester (manufactured by Takeda Riken Co.), and for half-life by means of Honestmeter (manufactured by Shishido Co.) at room temperature of 20°C. and at 50 % relative humidity. A conventional plastic material such as polystyrene, polymethyl methacrylate, or polyvinyl chloride showed a surface resistance of $5 \times 10^{13} \Omega$ or higher and an infinite half-life, whilst the specimen treated according to this invention showed a surface resistance of $10^9$ to $10^{10} \Omega$ and a half-life of 0.5 to 20 seconds.

Anti-clouding performance: The anti-clouding performance was evaluated by measuring scattering of light due to condensation of moisture on the surface of a plastic article. Into a glass thermostat ($5 \times 10 \times 15$ cm) maintained at 60°C., was introduced about 20 cc of warmed water at 60°C., and the thermostat was covered at the top with a colored acrylic sheet (opal sheet) to create an atmosphere of saturated water vapor at 60°C. in the thermostat. The top cover had a rectangular hole ($2 \times 3$ cm) in the center for transmission of light rays. The light rays incident to the thermostat through the bottom passed through the said hole to reach a photocell provided above the hole. The quantity of light passed through the hole was measured by said photocell. The hole was usually covered with a sheet of glass ($5 \times 10$ cm). In conducting the test, the sheet of glass was quickly replaced with a specimen ($5 \times 10$ cm) kept under an atmosphere adjusted to a constant temperature of 20° C. and a constant relative humidity of 50 %. After the lapse of 5 seconds the quantity of transmitted light was measured. The percentage decrease in the quantity of transmitted light against the quantity of light transmitted at room temperature was designated as cloudiness (%).

$$\text{Cloudiness (\%)} = \frac{\left( \begin{array}{c} \text{Quantity of light} \\ \text{transmitted at} \\ \text{room temp.} \end{array} \right) - \left( \begin{array}{c} \text{Quantity of} \\ \text{light trans-} \\ \text{mitted at 60°C.} \end{array} \right)}{\left( \begin{array}{c} \text{Quantity of light transmitted} \\ \text{at room temperature} \end{array} \right)}$$

The cloudiness of an untreated plastic article was 60 to 80 %, whilst the cloudiness became 5 to 50 % after treatment according to this invention.

EXAMPLE 1

Trimethylolpropane triacrylate (hereinafter abbreviated to TMP3A) was used as the cross-linking component (A). A mixture of 70 parts of TMP3A, 30 parts of acrylic acid (hereinafter abbreviated to AA) as the component (B), and 0.1 part of azobisisobutyronitrile and 1.0 part of benzoin butyl ether as photosensitisers was applied on a sheet of methacrylate resin. The methacrylate resin sheet together with the said mixture was sandwiched between two sheets of tempered glass, 5 mm in thickness, and fixed so that the thickness of the monomer layer might become about 20 $\mu$. The monomer layer was exposed for 8 hours to ultraviolet rays emitted from an ultraviolet irradiation apparatus provided with a bank of FL-20BL fluorescent chemical lamps, the distance between the lamp and the monomer layer having been 5 cm. Thereafter, the sandwich was heat-treated in a hot air oven at 120°C. for 30 minutes, then allowed to stand. After having been cooled, the glass sheets were removed. The specimen thus obtained was subjected to neutralization treatment at 60°C. for 5 minutes by successive immersion in an aqueous potassium hydroxide solution, an aqueous sodium hydroxide solution, and an aqueous ammonia solution, and thereafter washed repeatedly with water. The specimen was evaluated for surface hardness, antistatic capability, and anti-clouding performance. The specimen retained initial gloss and transparency, and the appearance did not undergo any change by neutralization treatment of the surface coat.

The results of evaluation were as shown in Table 1.

Table 1

| Run No. | Film composition (weight ratio) and neutralization treatment | Surface hardness (%) | Surface resistance ($\Omega$) | Half-life (sec.) | Cloudiness (%) |
| --- | --- | --- | --- | --- | --- |
| Control 1 | Substrate methacrylate resin | 36.7 | $75.0 \times 10^{14}$ | 7120 | 75 |
| 1 | TMP3A/AA = 70/30 No neutralization treatment | 93.5 | $3.0 \times 10^{13}$ | 65 | 65 |
| 2 | TMP3A/AA = 70/30 Treated with NaOH | 93.0 | $3.5 \times 10^9$ | 2.5 | 30 |
| 3 | TMP3A/AA = 70/30 Treated with KOH | 93.5 | $42 \times 10^9$ | 2.0 | 28.7 |
| 4 | TMP3A/AA = 70/30 Treated with NH$_4$OH | 93.0 | $40 \times 10^9$ | 2.3 | 29.0 |

EXAMPLE 2

Compositions of various component ratios were polymerized and cured in a manner similar to that in Example 1. Each of the specimens obtained was immersed in a 2-% aqueous sodium hydroxide solution at 60°C. for 1, 5, 20, or 60 minutes and evaluated for surface hardness, antistatic capability, and anti-clouding performance.

The results obtained were as shown in Table 2.

Table 2

| Run No. | Film composition (weight ratio) | Duration of NaOH treatment (min.) | Surface hardness (%) | Surface resistance (Ω) | Half-life (sec.) | Cloudiness (%) |
|---|---|---|---|---|---|---|
| 5 | TMP3A/AA = 85/15 | 5 | 98 | $2.2 \times 10^{10}$ | 20 | 45 |
| 6 | TMP3A/AA = 70/30 | 1 | 93 | $9.0 \times 10^{9}$ | 5.5 | 37 |
| 2 | TMP3A/AA = 70/30 | 5 | 93 | $3.5 \times 10^{9}$ | 2.5 | 30 |
| 7 | TMP3A/AA = 70/30 | 20 | 92.5 | $3.0 \times 10^{9}$ | 2.0 | 29.5 |
| 8 | TMP3A/AA = 70/30 | 60 | 93 | $3.0 \times 10^{9}$ | 1.8 | 27.0 |
| 9 | TMP3A/AA = 50/50 | 5 | 87 | $2.0 \times 10^{9}$ | 1.0 | 20 |
| 10 | TMP3A/AA = 30/70 | 5 | 57 | $1.5 \times 10^{9}$ | 0.5 | 13 |
| 11 | TMP3A/AA = 15/85 | 5 | 40 | $1.0 \times 10^{9}$ | 0.5 | 7 |
| 12 | TMP3A/addition product (1:1) of hydroxyethyl methacrylate and phthalic anhydride = 70/30 | 5 | 93 | $3.7 \times 10^{9}$ | 2.8 | 28 |
| 13 | TMP3A/addition product (1:1) of glycidyl metharylate and succinic acid = 70/30 | 5 | 95 | $3.4 \times 10^{9}$ | 2.0 | 30 |

EXAMPLE 3

A mixture of 60 parts of ethylene glycol dimethacrylate (hereinafter abbreviated to EDMA), tetraethylene glycol diacrylate (hereinafter abbreviated to 4EDA), 1,6-hexanediol diacrylate (hereinafter abbreviated to C6DA), or polyethylene glycol 400 dimethacrylate (hereinafter abbreviated to PEG400DMA) with 40 parts of methacrylic acid (hereinafter abbreviated to MAA) was uniformly coated on a methacrylate resin sheet by means of a bar coater to a thickness of about 50 μ. The coating was cross-linked by exposure under a nitrogen atmosphere to an accelerated electron beam produced by a 300-KV accelerator until total absorption dose amounted 16.0 Mrad. Subsequently, the specimen obtained was treated by immersion in a 2%-aqueous sodium hydroxide solution at 60°C. for 10 minutes. The treated specimen was evaluated for surface hardness, antistatic capability, anti-clouding performance, and adhesion. The results obtained were as shown in Table 3.

Table 3

| Run No. | Film composition (weight ratio) | Surface hardness (%) | Surface resistance (Ω) | Half-life (sec.) | Cloudiness (%) | Adhesion |
|---|---|---|---|---|---|---|
| 12 | EDMA/MAA = 60/40 | 85 | $3.0 \times 10^{9}$ | 1.5 | 25 | Good |
| 13 | 4EDA/MAA = 60/40 | 86 | $1.5 \times 10^{9}$ | 1.0 | 15 | Good |
| 14 | C6DA/MAA = 60/40 | 87.5 | $2.5 \times 10^{9}$ | 1.5 | 20 | Good |
| 15 | PEG400DMA/-MAA = 60/40 | 65 | $1.0 \times 10^{9}$ | 0.75 | 10 | Good |

Table 4

| Run No. | Substrate resin sheet | Surface hardness(%) | Surface resistance (Ω) | Half-life (sec.) | Cloudiness (%) | Adhesion |
|---|---|---|---|---|---|---|
| 12 | PMMA | 89.5 | $3.0 \times 10^{9}$ | 1.5 | 17 | Good |
| 17 | PC | 91.0 | $2.5 \times 10^{9}$ | 1.3 | 15 | Good |
| 18 | Pst | 90.3 | $2.2 \times 10^{9}$ | 1.7 | 19 | Good |
| 19 | ABS | 87.6 | $3.2 \times 10^{9}$ | 1.8 | — | Good |
| 20 | AS | 87.0 | $3.1 \times 10^{9}$ | 1.5 | — | Good |
| 21 | PET | 80.0 | $5.5 \times 10^{9}$ | 3.2 | — | Poor |
| 22 | PE | 83.0 | $6.0 \times 10^{9}$ | 2.9 | — | Poor |
| 23 | Phenol | 91.0 | $2.3 \times 10^{9}$ | 1.5 | 15 | Good |

Note:-
PMMA: Methacrylate resin
Pst: Polystrene resin
AS: Acrylonitrile-styrene resin
PE: Polyethylene resin
PC: Polycarbonate resin
ABS: Acrylontrile-butadiene-styrene resin
PET: Polyester resin
Phenol: Phenol-formaldehyde resin

EXAMPLE 5

To 50 parts of a 1 : 1 mixture of allyl methacrylate and ethylene glycol diacrylate, was added 30 parts of acrylic acid followed by 20 parts of 2-hydroxyethyl

EXAMPLE 4

In a manner similar to that in Example 3, a monomer mixture comprising 60 parts of 2EDMA and 40 parts of MAA was coated on various resin sheets, polymerized, and subjected to an alkali treatment. The results obtained were as shown in Table 4.

methacrylate, N-methylolated acrylamide, diacetone acrylamide

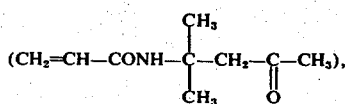

methyl acrylate, or styrene. The resulting mixture was admixed with 0.1 part of benzoyl peroxide as a polymerization initiator and 0.2 part of n-dodecylmercaptan as a modifier. The monomer mixture thus prepared was coated on a methacrylate resin sheet, allowed to polymerize by heating at 60°C. for 5 hours while being pressed with a tempered glass sheet to form a sandwich-like structure, and thereafter heat-treated at 120°C. for 2 hours. The specimen removed of the tempered glass sheet was immersed in a 2 %-aqueous sodium hydroxide solution at 60°C. for 10 minutes. The results obtained were as shown in Table 5.

Table 5

| Run No. | Comonomer | Surface hardness (%) | Surface resistance (Ω) | Half-life (sec.) | Cloudiness(%) |
|---|---|---|---|---|---|
| 24 | 2-Hydroxyethyl methacrylate | 72.5 | $2.0 \times 10^9$ | 2.0 | 13.5 |
| 25 | N-Methylolated acrylamide | 70.0 | $1.7 \times 10^9$ | 1.8 | 12.0 |
| 26 | Diacetone acrylamide | 70.0 | $1.5 \times 10^9$ | 1.5 | 11.3 |
| 27 | Methyl acrylate | 75 | $3.8 \times 10^9$ | 4.5 | 17 |
| 28 | Styrene | 68 | $4.9 \times 10^9$ | 3.9 | 19 |

EXAMPLE 6

A mixture of 60 parts of tetraethylene glycol dimethacrylate, 30 parts of acrylic acid, 10 parts of 2-hydroxyethyl methacrylate, and 0.2 part of azobisisobutyronitrile was coated on a tempered glass sheet, 200 × 200 mm, then covered with a piece of Mylar film, and allowed to polymerize and cure at 60°C. for 1 hour, then at 110°C. for 2 hours. A casting cell was constructed from thus treated pair of glass sheets arranged facing each other with both coated surfaces inside and a gasket interposed along edges. A partial polymer of methyl methacrylate containing 0.05 part of azobisisobutyronitrile was introduced into the cell and allowed to polymerize at 50°C. for 20 hours, then at 120°C. for 2 hours. After having been cooled, the glass sheets were removed to obtain a resin sheet, 3 mm in thickness. The sheet was immersed in a 2 %-aqueous sodium hydroxide solution at 60°C. for 20 minutes. The thus obtained colorless and transparent methacrylate resin sheet showed a surface hardness of 85 %, a surface resistance of $2.5 \times 10^9 \Omega$, a half-life of 2.5 seconds, and a cloudiness of 13.7 %, indicating that it is excellent in antistatic capability, anti-clouding performance, and hardness of the treated surface.

EXAMPLE 7

A mixture of 50 parts of TMP3A, 40 parts of acrylic acid, 10 parts of 2-hydroxyethyl methacrylate, 0.1 part of azobisisobutyronitrile, and 1 part of benzoin butyl ether was coated on a tempered glass sheet, 200 × 200 mm, then covered with a piece of Mylar film, and exposed for 20 minutes to ultraviolet rays emitted from an ultraviolet irradiation apparatus provided with a bank of FL-20BL fluorescent chemical lamps, at a distance of 5 cm. Thereafter, the coated layer was allowed to polymerize at 110°C. for 12 hours. In a manner similar to that in Example 6, by using the thus treated glass sheets, a methacrylate resin sheet, 3 mm thick, was obtained. The sheet was immersed in a 2 %-aqueous sodium hydroxide solution at 80°C. for 10 minutes. The thus treated surface of the methacrylate resin sheet showed a hardness of 85 %, a surface resistance of $1.8 \times 10^9 \Omega$, a half-life of 1.9 seconds, and a cloudiness of 10 %.

EXAMPLE 8

A methacrylate resin plate having a cross-linked film on its surface was prepared by repeating the same procedure as in Example 1, except that a composition of 70 parts of TMP3A, as the cross-linking component (A), 30 parts of acrylic acid as the component (B), an amount of water as shown in Table 6, and 1.0 parts of benzoin methyl ether as the photopolymerization initiator was substituted for the monomer mixture. The methacrylate resin plate was dipped in a 2 % aqueous sodium hydroxide solution at 60°C. for 5 min, and then washed with water. The thus obtained methacrylate resin plate was subjected to the same tests as in Example 1 to obtain the results shown in Table 6.

Table 6

| Run No. | Amount of water used (%) | Surface hardness (%) | Surface resistance (Ω) | Half-life (sec.) | Cloudiness (%) |
|---|---|---|---|---|---|
| 27 | 0 | 93.5 | $12.5 \times 10^9$ | 7.5 | 39 |
| 28 | 1 | 93.0 | $8.5 \times 10^9$ | 5.5 | 30 |
| 29 | 5 | 92.5 | $4.5 \times 10^9$ | 3.0 | 29.5 |
| 30 | 10 | 92.5 | $3.5 \times 10^9$ | 2.5 | 25.0 |
| 31 | 15 | 90.5 | $2.0 \times 10^9$ | 1.5 | 23.3 |

When water was used in an amount of 25 % based on the weight of the composition, no uniform resin composition was obtained and phase separation was caused.

EXAMPLE 9

A methacrylate resin plate having a cross-linked film on its surface was prepared in the same manner as in Example 1, except that a mixture of 70 parts of TMP3A as the cross-linking component (A), 10 parts of a mixture of acrylic acid and ammonium acrylate in a ratio as shown in Table 7, as the component (B), and 10 parts of hydroxyethyl methacrylate was substituted for the mixture of the film-forming components. The results of tests on the antistatic capability and anti-clouding performance of the resulting resin plate are shown in Table 7.

Table 7

| Run No. | Mole ratio of AA to AA ammonium salt | Antistatic capability (Half life) | Anti-clouding performance (Cloudiness) |
|---|---|---|---|
| 32 | 1/9 | < 5 sec. | < 40 % |
| 33 | 3/7 | < 5 sec. | < 40 % |
| 34 | 4/6 | < 5 sec. | < 40 % |
| 35 | 7/3 | 5 – 10 sec. | 40 – 50 % |
| 36 | 10/0 | > 20 sec. | > 50 % |

What is claimed is:
1. A plastic article having improved surface characteristics and comprising a plastic body having adhered thereon a cross-linked film of a composition consisting essentially of:
A. 10 to 90 parts by weight of a crosslinking unsaturated compound having a molecular weight of M and containing in the molecule N polymerizable ethylenically unsaturated radicals, N being an integer of at least 2, and selected from the group consisting of allyl acrylate, allyl methacrylate; methallyl acrylate; di- and tetra-esters of $\alpha,\beta$-unsaturated carboxylic acids with polyhydric alcohols; addition products of glycidyl acrylate or methacrylate with polybasic carboxylic acids; addition products of an epoxy resin with acrylic acid, methacrylic acid and crotonic acid; polyethylene glycol dimethacrylate and polypropylene glycol dimethacrylate; the ratio of said molecular weight M to said number N of ethylenically unsaturated radicals, M/N, being about 49 to about 600;

B. 90 to 10 parts by weight of an unsaturated monomer selected from the group consisting of acrylic acid; methacrylic acid; itaconic acid; crotonic acid; unsaturated carboxylic acids represented by the formula:

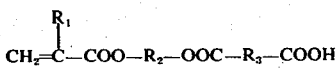

wherein $R_1$ is a hydrogen atom or a methyl group, $R_2$ is an alkylene group having 1 to 8 carbon atoms, and $R_3$ is an alkylene group having 1 to 8 carbon atoms, —CH=CH— or

unsaturated carboxylic acids represented by the formula:

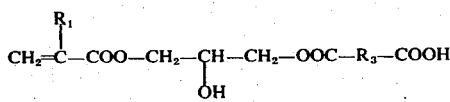

wherein $R_1$ and $R_3$ are the same as defined above; styrenesulfonic acid; and monoallyl and monomethallylesters of dibasic carboxylic acids; and C. up to 20 parts by weight of other copolymerizable unsaturated compound selected from the group consisting of monoesters of acrylic acid, methacrylic acid and crotonic acid with polyhydric alcohols; diacetone acrylamide; diacetone methacrylamide; N-methylol acrylamide and N-methylol methacrylamide; the total of (A), (B), and (C) being 100 parts by weight, at least a part of the acid radicals being converted into alkali salts thereof, said cross-linked film having a thickness of 5 to 500 $\mu$ and said plastic body being composed of homopolymers or copolymers of monovinyl monomers selected from the group consisting of methyl methacrylate, ethyl methacrylate, butyl methacrylate, cyclohexyl methacrylate, lauryl methacrylate, methyl acrylate, ethyl acrylate, butyl acrylate, 2-ethylhexyl acrylate, styrene, acrylonitrile, methacrylonitrile, vinyl chloride, and vinylidene chloride; copolymers of said monovinyl monomers with small amounts of crosslinking agents selected from the group consisting of ethylene glycol dimethacrylate, diethylene glycol dimethacrylate, trimethylol propane triacrylate, and glycerine triacrylate; and unsaturated polyesters cured by crosslinking.

2. A plastic article according to claim 1, wherein the component (A) is at least one compound selected from the group consisting of triethyleneglycol diacrylate or dimethacrylate, tetraethyleneglycol diacrylate or dimethacrylate, trimethylolpropane diacrylate or methacrylate, trimethylolpropane triacrylate or trimethacrylate and polyethyleneglycol diacrylate or dimethacrylate.

3. A plastic article according to claim 1, wherein the component (B) is at least one unsaturated acid selected from the group consisting of acrylic acid, methacrylic acid, itaconic acid, styrenesulfonic acid and unsaturated acids represented by the formula:

 (I)

wherein $R_1$ is hydrogen or methyl, $R_2$ is an alkylene of 1 to 8 carbon atoms, and $R_3$ is an alkylene of 1 to 8 carbon atoms, —CH = CH— or

4. A plastic article according to claim 1, wherein the alkali salts of the acid radicals contained in the film are composed of at least one member selected from the group consisting of ammonium salt, sodium salt and potassium salt.

5. A plastic article according to claim 1, wherein the plastic body is composed of a copolymer of at least 70 % by weight of methyl methacrylate and up to 30 % by weight of other copolymerizable vinyl monomers.

6. A plastic article according to claim 1, wherein the plastic body is composed of a copolymer of at least 70 % by weight of styrene and up to 30 % by weight of other copolymerizable vinyl monomers.

7. A plastic article according to claim 1, wherein at least 50 mole percent of the acid radical in the film has been converted into its alkali salt.

* * * * *